United States Patent [19]

Stolper

[11] Patent Number: 4,574,724

[45] Date of Patent: Mar. 11, 1986

[54] BOAT-HULL CONSTRUCTION

[75] Inventor: Peter R. Stolper, Newport, R.I.

[73] Assignee: David L. DelNero, Cranston, R.I. ; a part interest

[21] Appl. No.: 611,202

[22] Filed: May 17, 1984

[51] Int. Cl.⁴ .............................................. B63B 1/38
[52] U.S. Cl. .................................... 114/271; 114/288; 114/67 A; 114/62
[58] Field of Search .................... 114/62, 67 R, 67 A, 114/288–290

[56] References Cited

U.S. PATENT DOCUMENTS

| | | | |
|---|---|---|---|
| 1,254,892 | 1/1918 | Elniff | 114/67 A |
| 1,712,281 | 5/1929 | Royer | 114/288 |
| 1,877,380 | 9/1932 | Baldwin | 114/67 A |
| 2,488,183 | 1/1949 | Garmont | 114/62 |
| 3,902,445 | 9/1975 | Stolk | 114/62 |
| 4,392,445 | 7/1983 | Burg | 114/67 A |

Primary Examiner—Galen L. Barefoot
Assistant Examiner—Edwin L. Swinehart
Attorney, Agent, or Firm—Salter & Miachaelson

[57] ABSTRACT

A tunnel-type boat-hull construction is operative with substantially reduced frictional resistance in the water and also with improved high-speed stability. An air-withdrawal port is provided in the bow portion of the tunnel, and exit ports which are interconnected to the withdrawal port are provided along generally downwardly facing submerged surfaces of the hull. When the boat hull is operated in a forward direction, air is captured in the forward portion of the tunnel, and a portion of the air is withdrawn through the withdrawal port and is exited through the exit ports. The air which is exited through the exit ports provides lubrication for the submerged hull surfaces so that the hull is operative with substantially improved efficiency; and because the air is withdrawn from the bow portion of the tunnel, the bow uplift effects which are characteristic of conventional tunnel-hull-type vessels when they have been operated under high-speed conditions are substantially reduced.

11 Claims, 2 Drawing Figures

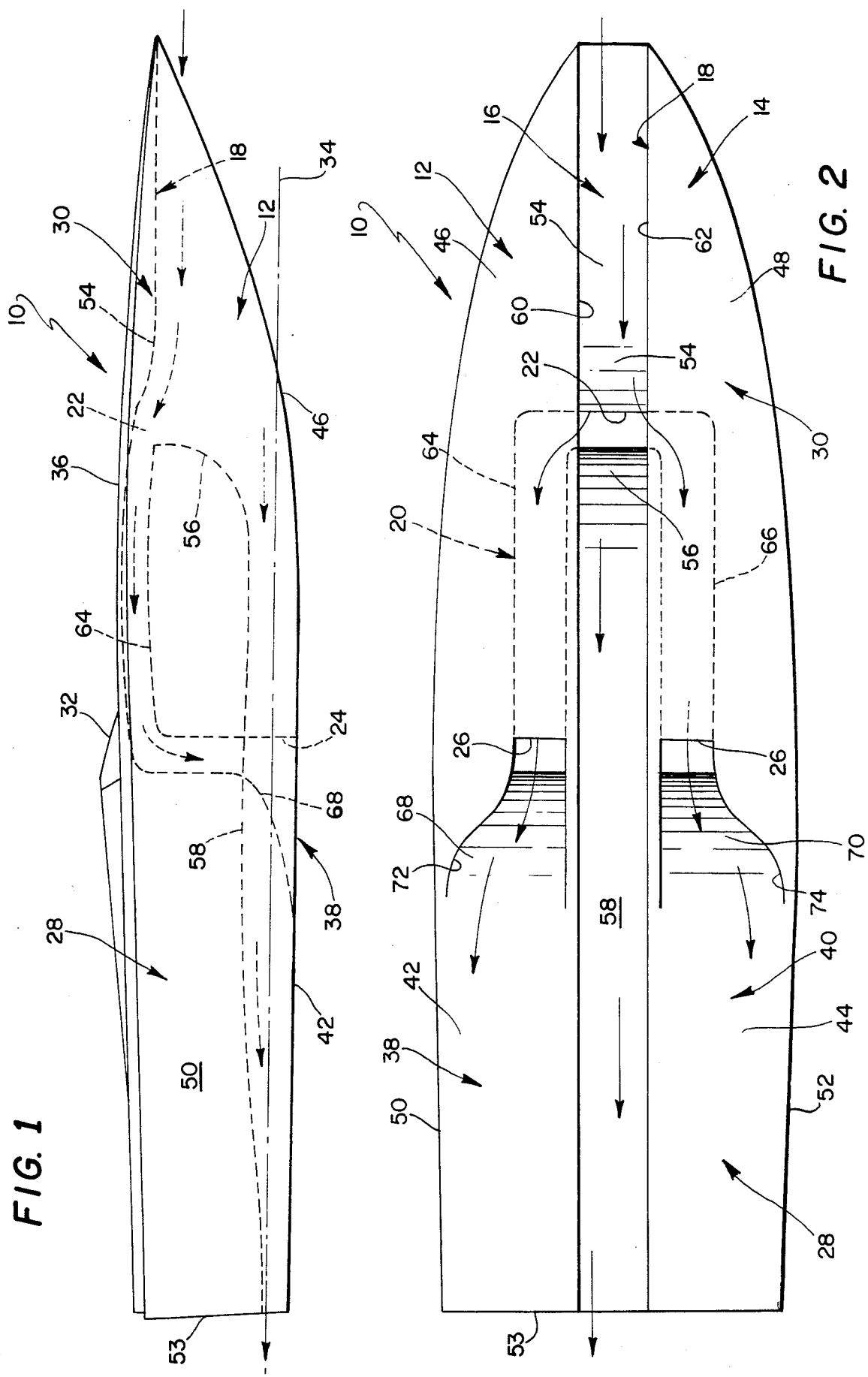

BOAT-HULL CONSTRUCTION

BACKGROUND AND SUMMARY OF THE INVENTION

The instant invention relates to a boat hull construction and more particularly to a novel tunnel-type boat hull construction which has improved high-speed stability and also reduced drag or frictional resistance when it is propelled through the water.

The primary source of resistance to the movement of any boat hull through the water is the frictional resistance which is applied by the water itself to the submerged surfaces of the hull. This phenomenon applies to both displacement-type vessels and planing-type vessels, although in either case the configurations and dimensions of the underwater surfaces of the vessel and the speed at which the vessel is propelled are obviously significant in determining the total frictional resistance which is applied to the vessel by the water during the movement of the vessel. Heretofore it has been known to reduce the frictional resistance or drag which is applied by the water to the submerged surfaces of a boat hull by emitting air in the form of bubbles along the submerged outer surfaces of the hull so that the air bubbles act as a lubricant between the hull surfaces and the water. It has been found that substantial reductions in frictional resistance can be achieved in this manner and that, as a result, substantial improvements in operating efficiency can be realized. In substantially all of the known vessels which have used air as a lubricant, the air has been supplied from forwardly facing ports which have extended upwardly from the deck areas thereof, and in some cases blowers or fans have been utilized for compressing the air to enhance its effectiveness as a lubricant. Most of the known hull constructions which have utilized air for reducing frictional resistance have been constructed with apertures in the submerged surfaces thereof for introducing air bubbles into the water along these surfaces so that when the hull is propelled through the water, the submerged hull surfaces are lubricated by the air bubbles and the frictional resistance to the movement of the hull from the water is substantially reduced. It has been found that the main drawback with respect to the peformance of hulls embodying this feature is that the air bubbles tend to make them somewhat unstable, particularly at high speeds. Other hull constructions which have been adapted to ride on large air pockets have also been generally known, but these hull constructions have also been somewhat unstable at high speeds.

Another factor which is a matter of primary concern in the design of a hull for any water vessel is the stability of the vessel hull at various operating speeds and under various sea conditions. It has been found that multi-hull vessels which comprise a plurality of spaced hull sections having open tunnel areas therebetween are particularly stable at slow and moderate operating speeds. Further, it has been found that one of the most stable multi-hull-type vessels is the tunnel-hull vessel which comprises a pair of spaced hull sections having a single open tunnel area therebetween. However, while multi-hull vessels have proven to be relatively stable at slow and moderate speeds, they have exhibited a tendency to trap large amounts of air under the bow areas thereof when they have been operated at high speeds, and this has often caused the bows of such vessels to be uplifted significantly under these operating conditions. This characteristic has made most multi-hull vessels somewhat unsafe at high speeds, and it has reduced the effectiveness and desirability of multi-hull vessel constructions for high-speed power-boat applications.

This instant invention relates to a novel boat-hull construction which provides both reduced frictional resistance or drag from the water and reduced bow uplift in a multi-hull vessel. Specifically, the boat-hull construction of the instant invention comprises a pair of transversely spaced, longitudinally extending hull sections, and a longitudinally extending connecting section between the hull sections which cooperates therewith to define an open tunnel, and means communicating with the forward portion of the tunnel in an area which is rearwardly spaced from the fore-end of the vessel for withdrawing air from the tunnel and for exiting or emitting the air in submerged areas of the undersides of the hull sections when the hull is underway in a forward direction. Accordingly, when the hull is propelled in a forward direction, air is trapped in the forward portion of the tunnel, and it is compressed by the movement of the vessel and by the configuration of the tunnel. Excess air which might otherwise cause bow uplift effects in the vessel is withdrawn from the forward portion of the tunnel, and this air is emitted along the undersides of the hull sections to provide a lubricating effect. Hence it is seen that the hull construction of the instant invention eliminates the disadvantages of the heretofore-known tunnel-type hull constructions, and it also provides an effective means for compressing air and for utilizing the compressed air for lubricating the submerged surfaces of the hull sections. In the preferred embodiment of the hull construction, air is withdrawn from the tunnel through a downwardly and forwardly facing withdrawal port in the forward portion of the tunnel, and the tunnel is formed to provide a funnel-like entry configuration for the withdrawl port to effect a natural compression of air as it is passed from the fore-end of the hull to the withdrawal port. In addition, in the preferred embodiment, the withdrawal port is spaced upwardly a substantial distance from the waterline of the hull consruction in order to avoid taking substantial quantities of water into the withdrawal port during the operation of the hull under heavy sea conditions. Further, in the preferred embodiment, the hull sections are formed with bottom surfaces which face generally downwardly when the hull is under way, and the air is exited through exit ports which extend substantially transversely across the hull sections so that the air is distributed in substantially uniform sheets of air which extend substantially transversely across the respective bottom surfaces of the hull sections rather than as bubbles, the exit ports preferably being located forward of the center of gravity of the hull construction so that most of the weight of the hull is carried on the air sheets. The exit ports are also preferably dimensioned so that the combined sectional areas thereof are substantially equal to the crosssectional area of the withdrawal port. Further, the main portion of the tunnel, i.e., that portion of the tunnel which is aft of the funnel-like area adjacent the withdrawal port, is preferably formed so that the central portion thereof has a slightly greater vertical height than the fore and aft portions thereof, and so that the aft portion has the smallest vertical height. This provides increased lift in the stern area of the hull construction in order to further minimize air uplift effects on the bow portion of the hull construction, and it also insures that the pressure in the main portion of the tunnel is the greatest in the central portion of the main portion where the vertical height of the tunnel is the greatest. Accordingly, the combined effects of all of these features of the hull construction provide an effective boat hull which can be operated with substantially increased efficiency and which is stable and safe under most sea conditions.

Vessel hull constructions which represent the closest prior art to the instant invention of which the applicant is aware are disclosed in the U.S. patents to Hone Nos. 1,812,265; Higgins 2,234,899; Wilson 3,191,572; Glass 3,547,064; Burg 4,165,703; and Cyr 4,407,215. All of these references teach hull constructions wherein means are provided for introducing air along the submerged surfaces of vessels for lubricating purposes. However, they do not provide means for exiting air in substantially uniform sheets, and they also do not suggest this feature in a tunnel-hull vessel wherein air is withdrawn from the tunnel and exited along the submerged surfaces of the hull sections in order to achieve the unique benefits provided by the hull construction of the instant invention. Hence, for these reasons, as well as for a number of other reasons which will hereinafter be made apparent, all of these references are believed to be of nothing more than general interest.

Accordingly, it is a primary object of the instant invention to provide a boat-hull construction of the type having at least two spaced longitudinally extending hull sections and an open tunnel area therebetween, wherein air is withdrawn from the tunnel and exited along the submerged surfaces of the hull sections to provide reduced frictoinal resistance between the submerged surfaces of the hull sections and the water when the hull construction is under way in a forward direction.

Another object of the instant invention is to provide a tunnel-type boat-hull construction wherein the bow portion of the hull construction is not normally uplifted significantly by air which is captured in the forward portion of the tunnel when the hull construction is operated under high-speed conditions.

A still further object of the instant invention is to provide a hull construction which comprises a pair of spaced hull sections having generally downwardly facing bottom surfaces, wherein air is exited through exit ports to provide substantially uniform continuous sheets of air along the bottom surfaces of the hull sections when the hull construction is under way in a forward direction.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view of the hull construction of the instant invention; and FIG. 2 is a bottom plan view thereof.

DESCRIPTION OF THE INVENTION

Referring now to the drawing, the hull construction of the instant invention is illustrated in FIGS. 1 and 2 and generally indicated at 10. The hull 10 generally comprises first and second transversely spaced, longitudinally extending hull sections 12 and 14, respectively, a longitudinally extending connecting section 16, which extends between the hull sections 12 and 14 and cooperates therewith to define a longitudinally extending tunnel generally indicated at 18, and a bifurcated duct network generally indicated at 20. The hull 10 is constructed so that when it is under way in a forward direction, air is withdrawn from the forward portion of the tunnel 18 through a withdrawal port 22, and the air is passed through the duct network 20 to first and second exit ports 24 and 26, respectively, which are located on the undersides of the hull sections 12 and 14, respectively. The exit ports 24 and 26 are formed so that the air which is exited therefrom is distributed in substantially uniform sheets of air along the bottom sides of the hull sections 12 and 14 in order to provide lubrication for the hull sections 12 and 14 during the movement of the hull 10 through the water. Further, by locating the withdrawal port 22 in the forward portion of the tunnel 18, excess air is withdrawn from the tunnel 18 during the movement of the hull 10 through the water in order to avoid the bow uplift effects which have been experienced with coventional tunnel-type vessel hulls when they have been operated at high speeds.

The hull 10 as herein illustrated and described is embodied in a motorpowered vessel which is adapted for high-speed planing operations, although it will be understood that the embodiment of the hull construction of the instant invention in a variety of other types of vessels is contemplated. The hull 10 can be constructed from a variety of different conventional construction materials, including wood, fiberglass and aluminum, utilizing conventional marine construction techniques. The hull sections 12 and 14 and the connecting section 16 are preferably integrally formed and include a main portion 28 comprising the central and aft portions of the hull 10, wherein an open cockpit area (not shown) and a motor and drive assembly (also not shown) are provided, and a bow portion 30 which extends forwardly from the main portion 28. A windshield 32 is provided adjacent the cockpit area in the main portion 28, and a waterline 34 provides a line of demarcation between those portions of the hull sections 12 and 14 which are normally submerged and those portions thereof which are normally located above the level of the water when the hull 10 is at rest. An upper deck 36 defines the upper extremities of the hull sections 12 and 14 and of the connecting section 16, and the lower extremities of the hull sections 12 and 14 are defined by bottom walls generally indicated at 38 and 40, respectively. The bottom walls 38 and 40 include substantially downwardly facing main bottom wall portions 42 and 44, respectively, which are located in the main portion 28 of the hull 10, and forward bottom wall portions 46 and 48, respectively, which extend arcuately upwardly and forwardly from the main portions 42 and 44, respectively, in the bow portion 30 of the hull 10, the forward bottom wall portions 46 and 48 being joined to the deck 36 at the forward extremity of the bow portion 30. The outer side peripheries of the hull sections 12 and 14 are defined by side walls 50 and 52, respectively, which extend from the deck 36 to the bottom walls 38 and 40, respectively, and are joined to their respective bottom walls 38 and 40 in angular relation to provide angular or "hard" chines in the hull 10. The aft ends of the hull sections 12 and 14 and the connecting section 16 are defined by a transom 53 which extends between the side walls 50 and 52 and is connected to the bottom walls 38 and 40 and to the deck 36. The side walls 50 and 52, the deck 36 and the bottom walls 38 and 40 are preferably formed to provide an arcuately tapered blunt-nosed configuration for the bow portion 30 of the hull 10.

The tunnel 18 extends longitudinally through the central portion of the hull 10, and it is defined by the hull sections 12 and 14 and the connecting section 16. The upper extremity of the forward bow portion of the tunnel 18 is defined by a bow portion upper tunnel wall 54 which is spaced upwardly from the waterline 34 so that preferably it is closely spaced from the deck 36, as illustrated in FIG. 1. The bow portion upper tunnel wall 54 extends arcuately upwardly slightly adjacent the aft end thereof, as illustrated, and it terminates adjacent the forward edge of the withdrawal port 22 which is substantially rectangular in the embodiment of the hull construction of the instant invention herein illustrated and faces generally downwardly and forwardly. A funnel wall 56 extends arcuately downwardly and rearwardly from a point adjacent the aft edge of the withdrawal port 22 to a point which is preferably spaced upwardly a relatively small distance from the waterline 34, and a main portion upper tunnel wall 58 extends rearwardly from the funnel wall 56 to the transom 54 for defining the upper extremity of the tunnel 18 in the main portion 28 of the hull 10. As will be seen from FIG. 1, the main portion upper tunnel wall 58 extends arcuately upwardly slightly in the central portion thereof and then downwardly slightly in the aft portion thereof. Accordingly, the central portion of the upper tunnel wall 58 is spaced upwardly from the waterline 34 by a slightly greater distance than other portions of the upper tunnel wall 58, and the wall 58 is spaced from the waterline 34 by the smallest amount adjacent the aft end of the tunnel 18. The side peripheries of the tunnel 18 are defined by opposed inwardly facing walls 60 and 62 of the hull sections 12 and 14, respectively, which extend between the bottom walls 38 and 40, respectively, and the walls 54, 56 and 58. Accordingly, the walls 60 and 62 cooperate with the walls 54 and 56 to define a funnel-like entry configuration for the withdrawal port 22, and they cooperate with the main portion upper tunnel wall 58 to define an elongated open tunnel section which extends longitudinally through the main portion 28 of the hull 10. The bifurcated duct network 20 comprises a pair of ducts 64 and 66 which communicate with the withdrawal port 22 and extend through the hull sectins 12 and 14 to the exit ports 24 and 26, respectively. The ducts 64 and 66 are preferably rigidly supported in the hull sections 12 and 14, respectively, and they define open passageways between the withdrawal port 22 and the exit ports 24 and 26. The exit ports 24 and 26 are located in the hull sections 12 and 14, respectively, so that they communicate with the bottom wall main portions 42 and 44, respectively, in the areas thereof which are aft of the points where the bottom walls 38 and 40 contact the water when the hull 10 is under way in a high-speed planing application and which are preferably forward of the center of gravity of the hull 10. Preferably the exit ports 24 and 26 are defined by outlet steps 68 and 70, respectively, which are formed in the hull sections 12 and 14, respectively, for distributing the air which is exited along the undersides of the hull sections 12 and 14. The outlet steps 68 and 70 are preferably formed with upper surfaces which extend arcuately downwardly and rearwardly, and outer side walls 72 and 74, respectively, which preferably extend arcuately outwardly and rearwardly, for distributing the air from the ports 24 and 26, in substantially uniform sheets which extend substantially transversely across the respective bottom walls 38 and 40. In this regard, preferably the outlet steps 68 and 70 are formed as prismatic ducts which have substantially uniform cross-sectional areas in the rearward extents thereof to assure that the air which is exited from the exit ports 24 and 26 is evenly distributed in substantially uniform sheets along the bottom wall portions 42 and 44 of the hull sections 12 and 14, respectively. In addition, the duct network 20, the withdrawl port 22 and the exit ports 24 and 26 are dimensioned so that the air which is emitted along the bottom wall portions 42 and 44 is pressurized to the proper amount so that it is substantially static or stationary with respect to the water beneath the hull 10.

For use and operation of the hull 10, the motor and drive assembly which is contained in the main portion 28 is operated to propel the hull 10 in a forward direction. Accordingly, air is captured in the forward portion of the tunnel 18, and a portion of this air is passed through the withdrawal port 22 to the exit ports 24 and 26. The forward portion of the tunnel 18 is configured to provide a funnel-like entry configuration for the withdrawal port 22, and this provides a high-pressure area adjacent the funnel wall 56 so that the air which enters the duct network 20 is at least slightly pressurized. Because the combined cross-sectional area of the exit ports 24 and 26 is preferably approximately equal to the cross-sectional area of the withdrawal port 22, the air which is exited through the exit ports 24 and 26 is pressurized by approximately the same amount as the air which enters the withdrawal port 22. The outlet steps 68 and 70 evenly distribute this pressurized air from the ports 24 and 26 in substantially uniform sheets of air which extend substantially transversely across the downwardly facing main portions 42 and 44 of the bottom walls 38 and 40, respectively. Since the ports 24 and 26 are positioned forward of the center of gravity of the hull 10, most of the weight of the hull 10 is carried on areas of the bottom surfaces 38 and 40 which are lubricated by sheets of air so that the frictional resistance between the surfaces of the main portions 42 and 44 and the water is substantially reduced. As a result, the hull 10 is operable with substantially increased efficiency, and it can be propelled at high speeds with a substantially lower horsepower requirement than a conventional vessel of similar size. In addition, because air is withdrawn from the forward portion of the tunnel 18 through the port 22, the wind uplift effects which have been an inherent charcteristic of substantially of the heretofore known tunnel-type hull constructions are substantially reduced so that the hull 10 can be operated at high speeds with a substantially higher degree of safety. Further, it has been found that the pressure in the portion of the tunnel which extends through the main portion 28 of the hull 10 is the greatest in the area thereof where the wall 58 is spaced upwardly by the greatest amount from the waterline 34. Accordingly because the tunnel 18 is designed so that the central portion of the upper tunnel wall 58 is spaced upwardly from the waterline 34 by the greatest amount, the area of maximum pressure in the portion of the tunnel which extends through the main portion 28 is located in the central portion of the main portion 28. This provides further increased stability in the hull 10; and since the aft end of the wall 58 defines the portion of the tunnel 18 which has the smallest vertical height, the aft end of the hull construction 10 is lifted upwardly slightly by the air flow through the tunnel 18 to further assure that the bow portion 30 of the hull 10 is not prone to air uplift effects during high-speed operations.

It is seen, therefore, that the instant invention provides a novel and effective construction for a multi-hull vessel. Air is withdrawn from the tunnel 18 and evenly distributed on the bottom surfaces 42 and 44 to lubricate the undersides of the hull sections 12 and 14, and by withdrawing air from the bow portion of the tunnel 18, the tendency for the bow portion 30 to be lifted upwardly during high-speed operations of the hull 10 is substantially reduced. Further, because the air is evenly distributed in substantially uniform sheets along the wall portions 42 and 44, the stability of the hull 10 is not adversely affected by the air. Accordingly, for these reasons, as well as the other reasons hereinabove set forth, it is seen that the hull construction of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A boat-hull construction comprising a pair of transversely spaced, longitudinally extending hull sections and a longitudinally extending connecting section between said hull sections, said connecting section cooperating with said hull sections to define a tunnel therebetween which extends longitudinally through said hull construction from the fore end thereof to the aft end thereof, said tunnel having an enlarged forwardly facing forward portion which is operative for receiving and compressing air therein when said hull construction is underway in a forward direction, said hull sections having exit ports in downwardly facing portions thereof, said exit ports being submerged when said hull construction is underway in a forward direction and operating in a planing condition, and duct means for withdrawing a portion of said compressed air from said forward portion and for exiting it in substantially uniform sheets through said exit ports so that it passes longitudinally along the undersides of said hull sections.

2. In the boat-hull construction of claim 1, said means communicating with said tunnel communicating therewith through a downwardly and forwardly facing withdrawal port in an area of the forward portion of said tunnel which is spaced upwardly a substantial amount with respect to the waterline of said hull construction.

3. In the boat-hull construction of claim 2, said tunnel being formed to provide a funnel-like entry configuration for said withdrawal port.

4. In the boat-hull construction of claim 1, said hull sections having bottom surfaces which face generally downwardly when said hull construction is under way in a forward direction, said withdrawn air being exited so that it is distributed in substantially uniform sheets which extend substantially across the transverse extents of the respective bottom surfaces.

5. The boat-hull construction of claim 1 further characterised as being dimensioned and configured so that said air is exited in areas of the undersides of said hull sections which are forward of the center of gravity of said hull construction.

6. In the boat-hull construction of claim 2, said hull sections having bottom surfaces which face generally downwardly when said hull construction is under way in a forward direction, each of said hull sections having an exit port therein which extends substantially transversely across the bottom surface thereof, said compressed air being exited through said exit ports, said exit ports being dimensioned and configured so that said compressed air is exited therefrom in substantially uniform sheets which extend substantially across the tranverse extents of the respective bottom surfaces.

7. In the boat-hull construction of claim 6, the combined sectional areas of said exit ports being approximately equal to the sectional area of said withdrawal port.

8. In the boat-hull construction of claim 7, said withdrawal port being located in said forward portion of said tunnel, said tunnel having a main portion which extends from a point in said tunnel which is adjacent said withdrawal port to the aft end of said hull construction, the vertical height of said tunnel in the central portion of said main portion being greater than the vertical heights of said tunnel at the fore and aft end portions of said main portion when said hull construction is under way in a forward direction.

9. In the boat-hull construction of claim 8, the vertical height of said tunnel being the smallest in the aft end portion of said tunnel main portion.

10. In the boat-hull construction of claim 1, said forward portion further characterized as being operative for naturally compressing air therein.

11. In the boat-hull construction of claim 1, substantially all of the air withdrawn through said duct means being exited through said exit ports.

* * * * *